United States Patent [19]

Naito

[11] Patent Number: 4,856,609
[45] Date of Patent: Aug. 15, 1989

[54] CONSTANT-SPEED RUNNING CONTROL DEVICE FOR VEHICLES

[75] Inventor: Yasuo Naito, Himeji, Japan

[73] Assignee: Mitsubishi Denki Kabushiki Kaisha, Tokyo, Japan

[21] Appl. No.: 186,474

[22] PCT Filed: Jul. 15, 1987

[86] PCT No.: PCT/JP87/00515

§ 371 Date: Mar. 9, 1988

§ 102(e) Date: Mar. 9, 1988

[30] Foreign Application Priority Data

Jul. 18, 1986 [JP] Japan ................... 170150/86

[51] Int. Cl.$^4$ ............................................. B60K 31/04
[52] U.S. Cl. ........................... 180/179; 364/424.01;
364/431.07; 123/350
[58] Field of Search ............. 180/175, 176, 177, 178,
180/179; 324/160, 161; 364/424.01, 426,
431.07, 565, 566; 123/350, 352, 353, 360

[56] References Cited

U.S. PATENT DOCUMENTS

| | | | |
|---|---|---|---|
| 4,202,424 | 5/1980 | Sakakibara et al. | 180/176 |
| 4,451,888 | 5/1984 | Kuno et al. | 180/176 X |
| 4,467,428 | 8/1984 | Caldwell | 180/179 X |
| 4,620,519 | 11/1986 | Nagao et al. | 123/419 X |
| 4,646,861 | 3/1987 | Kawaya | 180/176 |
| 4,707,792 | 11/1987 | Naitou | 180/176 X |
| 4,739,485 | 4/1988 | Hayashi | 364/431.07 |

FOREIGN PATENT DOCUMENTS 58-39311 3/1983 Japan .

Primary Examiner—Charles A. Marmor
Assistant Examiner—Brian L. Johnson
Attorney, Agent, or Firm—Bernard, Rothwell & Brown

[57] ABSTRACT

A constant-speed running control device for vehicles of the present invention adopts such a control that increases a control gain for a specific period of time after the start of constant-speed running control and, thereafter, decreases the control gain back to the original value correspondingly to a speed deviation. Therefore, there can be attained the effect that the speed deviation immediately after the start of constant-speed running control will not increase with the upward and downward road conditions and variations in the amount of play for the control of throttle valve opening, and that the running speed will not exceed the target speed particularly when traveling on a downward hill and when the amount of play is little.

1 Claim, 6 Drawing Sheets

FIG. 1(a) PRIOR ART
FIG. 1(b) PRIOR ART
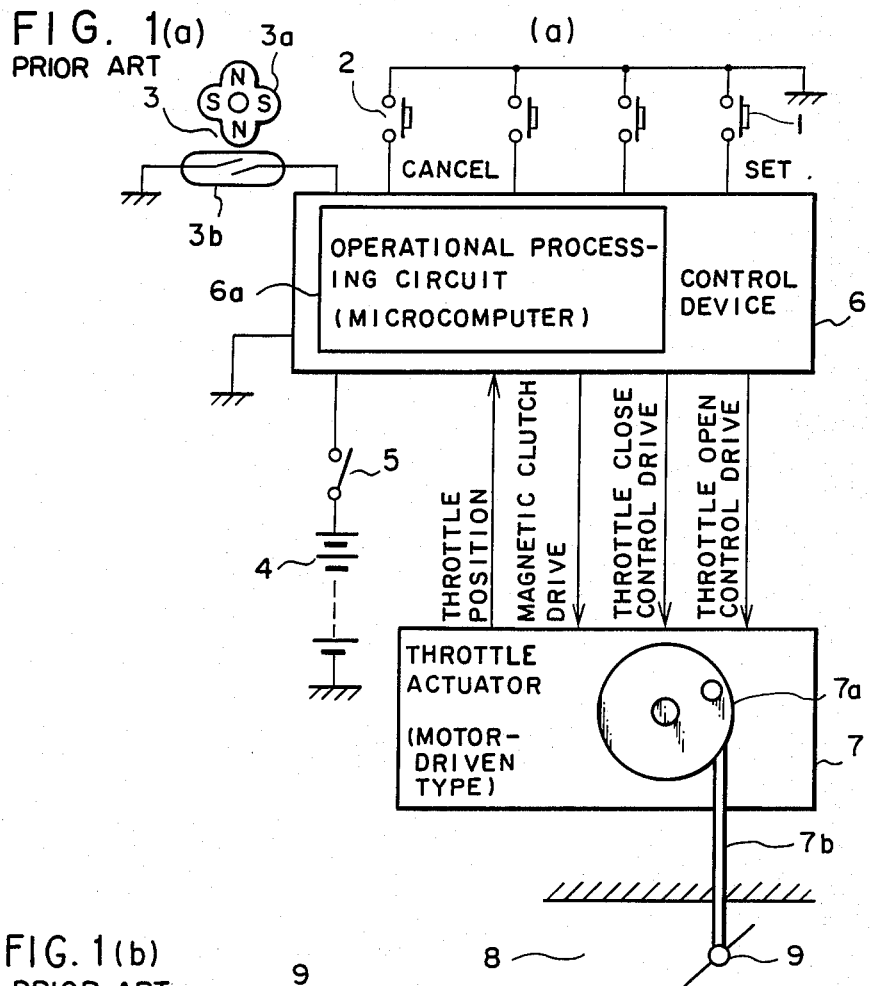
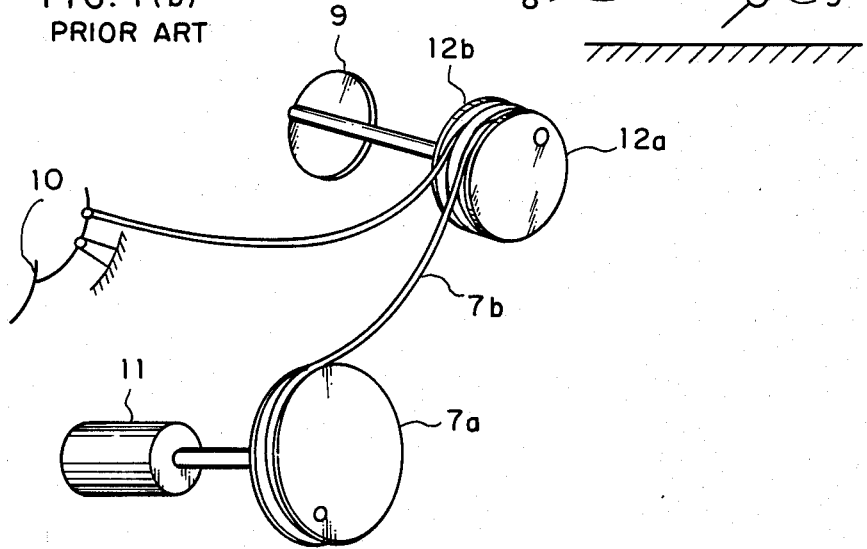

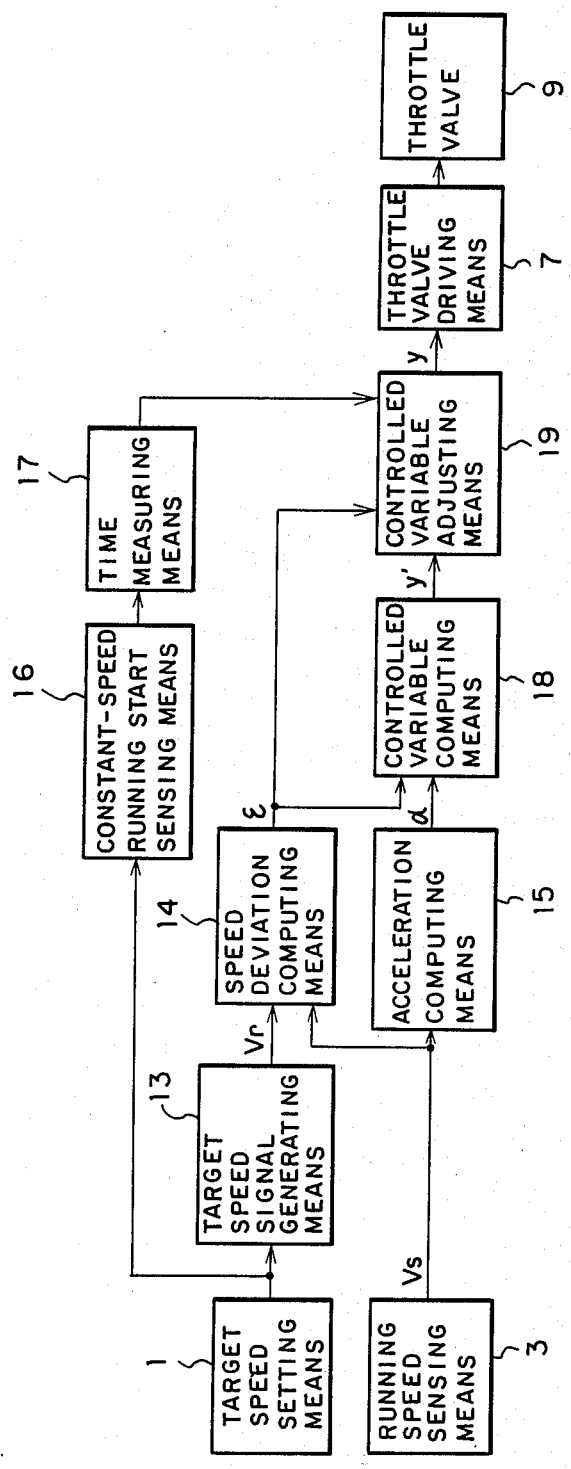

CONSTANT-SPEED RUNNING CONTROL DEVICE FOR VEHICLES

TECHNICAL FIELD

The present invention relates to a constant-speed running control device for vehicles which automatically keeps a constant running speed of a vehicle.

BACKGROUND ART

Conventional constant-speed running control devices for vehicles are of the constitution as illustrated in FIG. 1(a). This drawing gives a block diagram showing this type of prior-art constant-speed running control device for vehicles disclosed in for example Laid-Open Japanese Pat. No. Sho 58-39311. In this drawing, 1 indicates a SET switch which enables a driver to set the start of constant-speed running; 2 is a CANCEL switch which is operated by operation of a brake system (not illustrated), allowing cancellation of constant-speed running; and 3 is a vehicle speed sensor for sensing running speed of the vehicle. It, comprising a rotary body 3a which has four magnetic poles and is driven by means of a meter cable (not illustrated) for transmitting rotation of a transmission (not illustrated) and a reed switch 3b, outputs a pulse-train signal at a frequency proportional to the running speed.

Turning on the main switch 5, which functions as a power switch for supplying electric power from the battery 4 for vehicle, provides the electric power to the control device 6, which will then operate. The control device 6 includes an operational processing circuit 6a of a microcomputer, for example, therewithin. It inputs signals from the SET switch 1, the CANCEL switch 2 and the vehicle-speed sensor 3, and outputs various control signals, after performing various processing operations, to make automatic control to keep a vehicle running speed $v_s$ at a target speed $v_r$.

A throttle actuator 7 is a motor-driven throttle actuator disposed in an intake passage 8 of an engine (not illustrated). Receiving various signals from the control device 6, it opens and closes a throttle valve 9 in interlock with an accelerator pedal (not illustrated).

This throttle actuator 7 drives the throttle valve 9 through a wire 7b connected to a link 7a which is turned by a motor (not illustrated).

The angle of rotation of the link 7a corresponding to the opening of this throttle valve 9 is sensed by a built-in potentiometer (not illustrated), and given as a throttle position signal to the control device 6.

The link 7a and the motor are connected by means of a magnetic clutch (not illustrated); the connected state is controlled by a magnetic clutch signal from the control device 6.

Next the operation of a conventional constant-speed running control device of the above-mentioned constitution for vehicles is as follows. First, when the main switch is turned on by a driver, the power is supplied from the battery 4 to start the operation of the control device 6, thus processing the output of the vehicle-speed sensor 3. This vehicle-speed sensor 3 outputs a pulse-train signal having a frequency proportional to a running speed $v_s$ at which the vehicle is traveling. The control device 6 measures the period of this pulse, thereby determining the running speed $v_s$.

When the driver operates the SET switch 1, a signal from this switch is given to the control device 6, and the running speed $v_s$ at this time is stored as the target speed $v_r$; thus the control of constant-speed running is started.

Henceforth, the control device 6 compares an actual running speed $v_s$ changing every second, with the target speed $v_r$, and outputs a control signal to drive the throttle actuator 7 and control the opening of the throttle valve 9 so that the vehicle can travel at the target speed $v_r$.

Namely, when the actual running speed $v_s$ is slower than the target speed $v_r$, the control device 6 will output a THROTTLE OPEN CONTROL DRIVE signal to open the throttle valve 9 to a specific amount of opening, and reversely when the actual running speed $v_s$ is higher, a THROTTLE CLOSE CONTROL DRIVE signal will be outputted to close the throttle valve 9 to a specific amount of opening, and therefore the vehicle can travel at a constant speed without the driver's actuation of the accelerator pedal.

If the driver operates the brake system in mid course of such constant-speed running control, the CANCEL switch 2 will operate to give a CONSTANT-SPEED RUNNING CANCEL signal to the control device 6.

Upon receiving this signal, the control device 6 outputs a signal to release the magnetic clutch and throttle actuator 7, receiving this signal, will release the magnetic clutch.

Therefore, henceforth the driver adjusts the opening of the throttle valve 9 by the accelerator pedal, thus controlling the running speed of vehicle.

In the conventional constant-speed running control device for vehicles that is constituted as described above, when the driver has turned on the SET switch 1 to run the vehicle at a fixed vehicle speed, the control device 6 first outputs a drive signal to control the opening of the throttle to a specific amount (setup amount). Thereafter it calculates every moment a controlled variable (trimmed amount) from a speed deviation $\epsilon$ between the target speed $v_r$ and the running speed $v_s$ and the acceleration $\alpha$, and outputs.

This controlled variable (trimmed amount) is equivalent to the gain of the control system, and is determined by the convergence and speed deviation of the running speed $v_s$ with respect to the target speed $v_r$.

The trimmed amount, if much, provides good convergence, but tends to cause a hunting running speed, resulting in lowered driving comfort. Reversely, the trimmed amount, if little, tends to reduce the convergence.

In the meantime, the first specific amount (setup amount) has a purpose to control in advance the throttle opening to the vicinity of an opening required, in order to maintain the target speed.

This setup amount takes part in running safety thereafter; in case of an improper setup amount, the speed deviation immediately after setting will increase.

Formerly, this setup amount was a fixed value, or a specific value proportional to the running speed and target speed.

This is the amount determined when the vehicle has a standard throttle actuator function, and on the assumption that the road is level.

The setup amount required, however, varies with a change in the amount of mechanical play of the throttle actuator.

The play will be explained by reference to FIG. 1(b). In FIG. 1(b), there exists a play between a motor 11 and a link 7a, between the link 7a and a wire 7b, with the wire 7b itself, between the wire 7b and a throttle link 12b, and between the throttle link 12a and 12b. Furthermore, a period of time from the start of rotation of the motor 11 till the start of movement of the throttle valve 9 in response to this rotation is also called "play".

This play is likely to vary with vehicles or with age. If there exists too much play, throttle opening is insufficient with the specific setup amount. Reversely, if the play is too little, the throttle opening will be controlled in excess with the specific setup amount.

Furthermore, there is such a drawback that the play varies with road condition; when the driver turns on the SET switch 1 on an upward hill for example, the throttle opening will become insufficient in the case of the specific setup amount, and, reversely, will become excessive on a downward hill, resulting in an increased speed deviation immediately after setting.

This speed deviation is gradually converged by the variable (trimmed amount) to be outputted after the completion of output of the setup amount; however, since the trimmed amount is determined by convergence and trade-off of speed deviation; there is such a shortcoming that if the setup amount is improper, the speed deviation increases.

Furthermore, there is a drawback that, particularly when the vehicle is traveling with a specific setup amount on a downward hill or with a little amount of play, the set deviation will temporarily become positive, that is, the running speed will exceed the target speed, which, being a vehicle behavior immediately after setting, will cause the driver to have a feeling of uneasiness.

The present invention has been accomplished in an attempt to solve these problems, and has as its object the provision of a constant-speed running control device for vehicles that is capable of reducing an influence of road conditions and the amount of play, controlling to rapidly bring the running speed close to the target speed, and, especially, preventing the speed deviation from becoming positive at the time of setting.

SUMMARY OF THE INVENTION

The constant-speed running control device for vehicles pertaining to the present invention is provided with a controlled variable computing means which senses the instant the driver sets a target speed, and determines a controlled variable from speed deviation and acceleration, unconditionally within a fixed period of time after this instant, and, thereafter determines when a speed deviation between the target vehicle speed and the running vehicle speed is out of a range of specific value.

In the present invention, the method for computing the controlled variable from the speed deviation and acceleration is changed, during usual constant-speed running, unconditionally within a fixed period of time from the instant of setting the target speed by the controlled variable computing means, and, after the fixed period of time, in case that the speed deviation between the target vehicle speed and the running vehicle speed is out of a specific range.

BRIEF DESCRIPTION OF THE DRAWINGS

FIG. 1(a) is a general block diagram showing a conventional constant-speed running control device for vehicles;

FIG. 1(b) is a view showing a mechanical play of the throttle actuator of the conventional constant-speed running control device for vehicles;

FIG. 2 is a block diagram showing the constitution of one embodiment of a constant-speed running control device of the present invention;

DESCRIPTION OF PREFERRED EMBODIMENT

Figure 3:
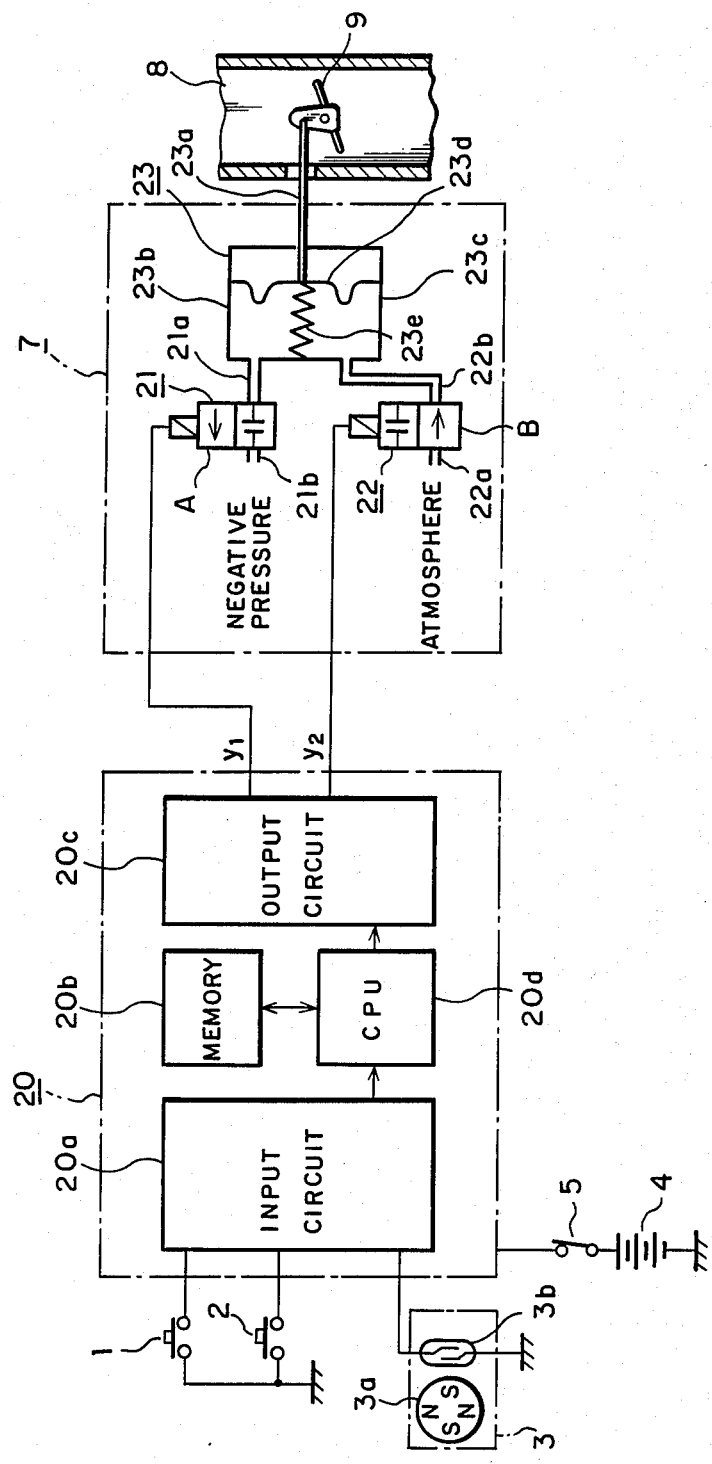
FIG. 3 is a view showing the constitution of a microcomputer unit and a throttle valve driving means in the same constant-speed running control device for vehicles.

A preferred embodiment of the present invention will now be described with reference to the accompanying drawings. FIG. 2 is a block diagram showing the constitution of the embodiment. In this drawing, numeral 3 designates a running speed sensing means for sensing the running speed of vehicle; and numeral 1 designates a target speed setting means by which a driver sets a desired target vehicle speed.

The target speed signal generating means 13 is designed to receive the output of this target speed setting means 1, generate the target speed signal $v_r$ which expresses the target speed, and compute, using the speed deviation computing means 14, the speed deviation signal $\epsilon(=v_r-v_s)$ given by the running speed signal $v_s$ and the target speed signal $v_r$.

The acceleration computing means 15 is designed to determine the acceleration $\alpha$ every fixed period of time from the running speed signal $v_s$ and outputs to the controlled variable computing means 18.

This controlled variable computing means 18 receives the speed deviation $\epsilon$ from the speed deviation computing means 14 and this acceleration $\alpha$ as inputs, processes the controlled variable $y'$ for controlling a vehicle driving force such that the running speed will correspond to the target speed, and outputs to the controlled variable adjusting means 19.

In the meantime, the constant-speed running start sensing means 16 senses the start of constant-speed running. From the instant that this constant-speed running start sensing means 16 has sensed the setting of the target speed, the time measuring means 17 starts measuring a specific period of time and outputs a result of measurements to the controlled variable adjusting means 19.

The controlled variable adjusting means 19 adjusts and outputs the controlled variable $y'$ when the above-described specific period of time is not over; however, when the specific period of time is over and the speed deviation $\epsilon$ exceeds a specific value, it similarly adjusts and outputs the controlled variable $y'$, and when the speed deviation $\epsilon$ has decreased to less than the specific value after the lapse of the fixed period of time, it will output the controlled variable $y'$ $(=y)$ without adjustment.

A throttle valve driving means 7 operates a throttle valve 9 which adjusts the output of the engine (not illustrated) on the basis of the controlled variable y.

Next, an embodiment of the present invention will be explained by reference to FIGS. 3 to 6. In these drawings, numerals 1 to 5 and 8 to 9 are the same as those used in FIGS. 1(a) and 1(b).

A SET switch 1 and a VEHICLE-SPEED sensor 3 in FIG. 3 correspond to the target speed setting means 1 and the running-speed sensing means 3 in FIG. 2 respectively.

Furthermore, numeral 20 in FIG. 3 is a microcomputer unit which functions as the same control device as the control device 6 in FIG. 1(a). It comprises an input circuit 20a which operates when a main switch 5 is turned on, and inputs and processes signals from the SET switch 1, a CANCEL switch 2, and a VEHICLE-SPEED sensor 3; a memory 20b comprising ROM and RAM for storing instruction programs; an output circuit 20c which outputs control signals; and a CPU 20d which operates in accordance with the instruction programs from the memory 20b, processes signals from the input circuit 20a, and outputs to the output circuit 20c.

A numeral 21 designates a solenoid valve which is controlled by a control signal $y_1$ from the microcomputer unit 20, which disconnects an input tube 21a connected to a negative pressure source (not illustrated), from an output tube 21b when the control signal $y_1$ is at an "L" level, and connects the tubes when the control signal $y_1$ is at an "H" level as shown by the arrow A in the drawing.

A numeral 22 also indicates a solenoid valve which is controlled by a control signal $y_2$. It connects an input tube 22a open to the atmosphere to an output tube 22b as shown by the arrow B in the drawing when the control signal $y_2$ is at the "L" level, and disconnects when the control signal $y_2$ is at the "H" level.

A numeral 23 is a diaphragm device to which the input tube 21a of the solenoid valve 21 and the output tube 22b of the solenoid valve 22 are connected, and which drives the throttle valve 9 through a wire 23a. It includes a diaphragm 23d to which a casing 23c forming an air chamber 23b connected with the input tube 21a and the output tube 22b, and the aforesaid wire 23a are connected, and a spring 23e which is installed between this diaphragm 23d and the casing 23c and presses the diaphragm 23d in the rightward direction illustrated. The solenoid valves 21 and 22 constitute the throttle valve drive means 7.

This throttle valve drive means 7 has three modes of operation as shown in Table 1. When the control signals $y_1$ and $y_2$ are both at the "H" level, the solenoid valve 21 opens, while the solenoid valve 22 closes. Therefore, the air chamber 23b of the diaphragm device 23 communicates only to the negative pressure source, and the diaphragm 23d moves leftwardly in the drawing, thus opening the throttle valve 9 to increase the vehicle speed. That is, the vehicle travels in the acceleration mode.

In the deceleration mode, when the control signals $y_1$ and $y_2$ are both at the "L" level, the solenoid valve 21 closes and the solenoid valve 22 opens. Therefore, the air chamber 23b opens only to the atmosphere, and accordingly the diaphragm 23d, being pressed by the spring 23c, will move rightwardly in the drawing, thus closing the throttle valve 9 and decreasing the vehicle speed.

Furthermore, in the HOLD mode, when the control signals $y_1$ and $y_2$ are at the "L" and "H" levels respectively, both the solenoid valves 21 and 22 close and accordingly the air chamber 23 will be closed off from the negative pressure source and the atmosphere; since the diaphragm 23d will be fixed in a position at this time, the opening of the throttle valve 9 also will be fixed.

TABLE 1

| Operation modes | Y1 | Y2 | Throttle valve |
| --- | --- | --- | --- |
| Acceleration mode | H | H | Open |
| Deceleration mode | L | L | Close |
| Hold mode | L | H | Fixed |

Next described is the operation of the embodiment of FIG. 3 that is constituted as previously stated. The operation of the microcomputer unit 20 will be explained particularly by reference to flowcharts of FIG. 4(a) to (c).

Figure 4A:
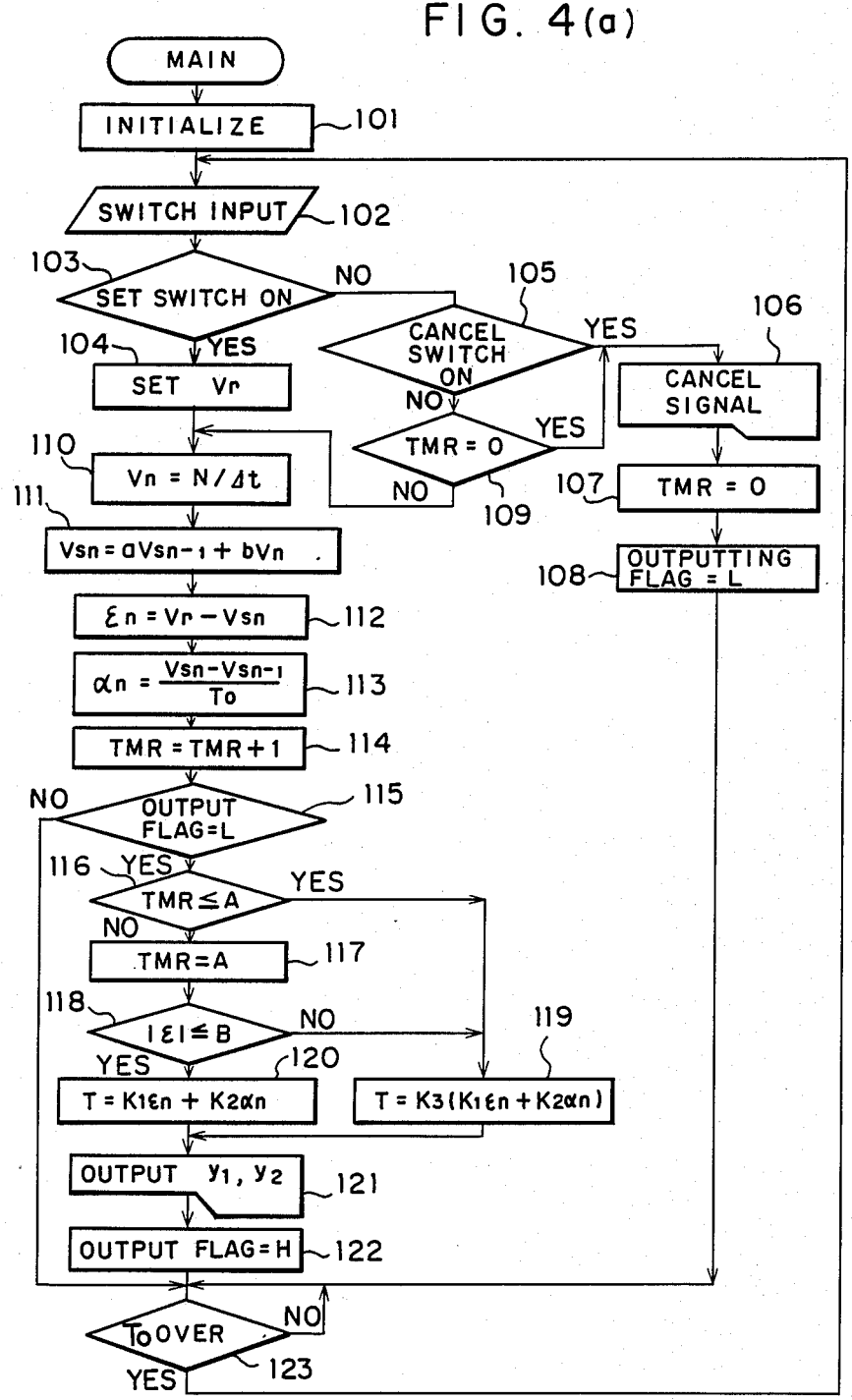
FIG. 4(a) to (c) are flowcharts showing the flow of operation of the same constant-speed running control device for vehicles.

First, when the main switch 5 is turned on, the control device is initialized by Step 101 in FIG. 4(a) and the microcomputer unit 20, supplied with the power, starts operation, executing main routine processing of FIG. 4(a).

Figure 4B:
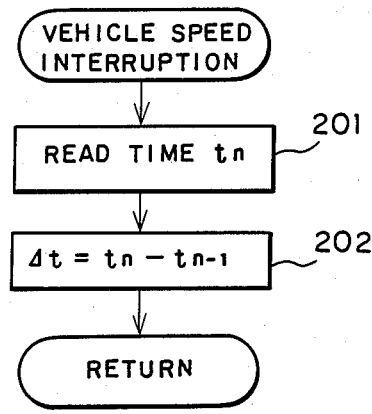
Figure 5:
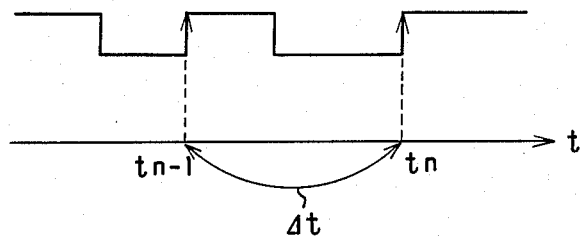
FIG. 5 is a chart showing the output waveform of a vehicle-speed sensor in FIG. 3.

In the meantime, when the vehicle is traveling, the vehicle-speed sensor 3 outputs a pulse-train signal having a frequency proportional to the running speed as shown in FIG. 5. This signal is used to operate the microcomputer unit 20 to perform an interruption routine processing as shown in FIG. 4(b).

Namely, every time the rise of the pulse-train signal of FIG. 5 is inputted, the processing in FIG. 4(b) is executed, and the time $t_n$ when the aforesaid rise is inputted, is read from a timer at step 201 (not illustrated). At Step 202, upon determining a difference $\Delta t$ from the previous time of rise $t_{n-1}$ (i.e. $\Delta t = t_n - t_{n-1}$), or a period, the procedure returns to the main routine in FIG. 4(a).

This period of pulse-train signal thus obtained, the running speed is given by conversion value of the period.

Subsequently, when the driver operates the SET switch 1 during travel to start constant-speed running, the microcomputer 20 inputs this switch operation, as shown at Step 102 in FIG. 4(a); and when, at Step 103, the signal is judged to be as a signal from the SET switch 1, the target speed signal $v_r$ is set in step 104 from the pulse frequency $\Delta t$ that has been obtained by the interruption routine processing of FIG. 4(b).

At Step 105, a check is made to see whether or not the above-described switch input signal is from the CANCEL switch (2 in FIG. 3), and when it is a CANCEL signal, it outputs the CANCEL signal to the throttle valve drive means 7 so that the constant-speed control will be stopped at Step 106.

At Step 107, the timer (TMR) is set to zero. At Step 108, the flag during output of the throttle valve drive signal is set to "L".

At Step 109, a check is made to see whether or not the timer TMR has been set to zero.

At Step 110, the running speed $v_n$ is given by the following formula (1) from the newest pulse period $t_n$ that has been obtained in FIG. 4(b).

$$v_n = N/\Delta t \quad (1)$$

where N is a constant for conversion to speed.

At Step 111, noise components are smoothed for the purpose of reduction. For the smoothing means, a digital filter is used, and the running speed $v_{sn}$ is given from for example the following formula (2).

$$v_{sn} = a v_{sn-1} + b v_n \quad (2)$$

where a and b are constants expressing smoothing characteristics. The designation n denotes a value obtained this time, while n−1 indicates a previous value.

At Step 112, the speed deviation $\epsilon$ between the target speed $v_r$ and the running speed $v_{sn}$ is given by the following formula (3).

$$\epsilon_n = v_r - v_{sn} \quad (3)$$

At Step 113, acceleration at each fixed time $T_o$ of the running speed $v_{sn}$ is obtained from the following formula (4).

$$\alpha_n = \frac{v_{sn} - v_{sn-1}}{T_o} \quad (4)$$

At Step 114, 1 is added to the timer TMR.

At Step 115, a check is made to see whether or not there is being outputted a signal for driving the throttle valve. If the signal is outputted, Step 116 will check to see whether or not the timer TMR is under the specific value A. If Timer TMR>A, A is to be substituted into the timer at Step 117.

At Step 118, a check is made to see whether the speed deviation $\epsilon$ is out of the range of the specific value B. At Step 120, a usual controlled variable for driving the throttle valve is computed. As a method for computing, the following formula (5) using for example the speed deviation $\epsilon$ and the acceleration $\alpha$ is considered.

$$T = K_1 \epsilon_n + K_2 \alpha_n \quad (5)$$

where $K_1$ and $K_2$ are constants.

In the meantime, in Step 119, when the time after turning on the SET switch is within the specific time (A) or when the speed deviation is out of the range of other than the specific value B, computation is made using the following formula (6) to increase the controlled variable for driving the throttle valve.

$$T = K_3(K_1 \epsilon_n + K_2 \alpha_n) \quad (6)$$

where $K_3$ is a constant.

At Step 121 the output level of the control signals $y_1$ and $y_2$ is obtained from Table 2 given below, in accordance with the code of the time T for outputting the controlled variable thus computed, and outputted. Also the output time T is set to the timer (not illustrated).

TABLE 2

| T | Control modes | Y1 | Y2 |
|---|---|---|---|
| Positive | Acceleration mode | H | H |
| Negative | Deceleration mode | L | L |
| O | Hold mode | L | H |

At Step 122 the flag indicating that the control signal is being outputted is set to "H".

At Step 123, wait until the specific time $T_o$ elapses. After the lapse of the specific time, return to Step 102 and execute each step by a similar procedure.

In the meantime, when the control signals $y_1$ and $y_2$ are outputted, another timer other than the one above-described is started so as to count the control signal output time. When the timer reading corresponds to the output time T previously set, proceed to the timer interruption routine of FIG. 4(c).

Figure 4C:
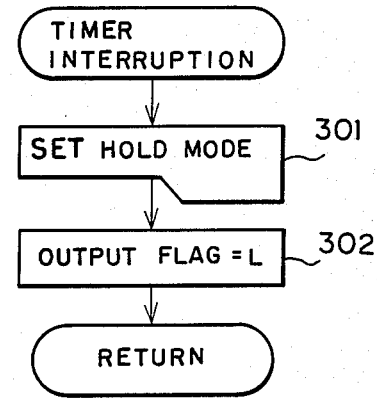

In this FIG. 4(c), at Step 301, the control mode is changed to the hold mode. At Step 302, the flag during the output of the control signal is set to "L", and thereafter the procedure returns again to the main routine.

As described above, the output of the acceleration mode or the deceleration mode for the output time T is given from the microcomputer unit 20 to the throttle valve drive means 7 every specific time $T_o$.

Figure 6:
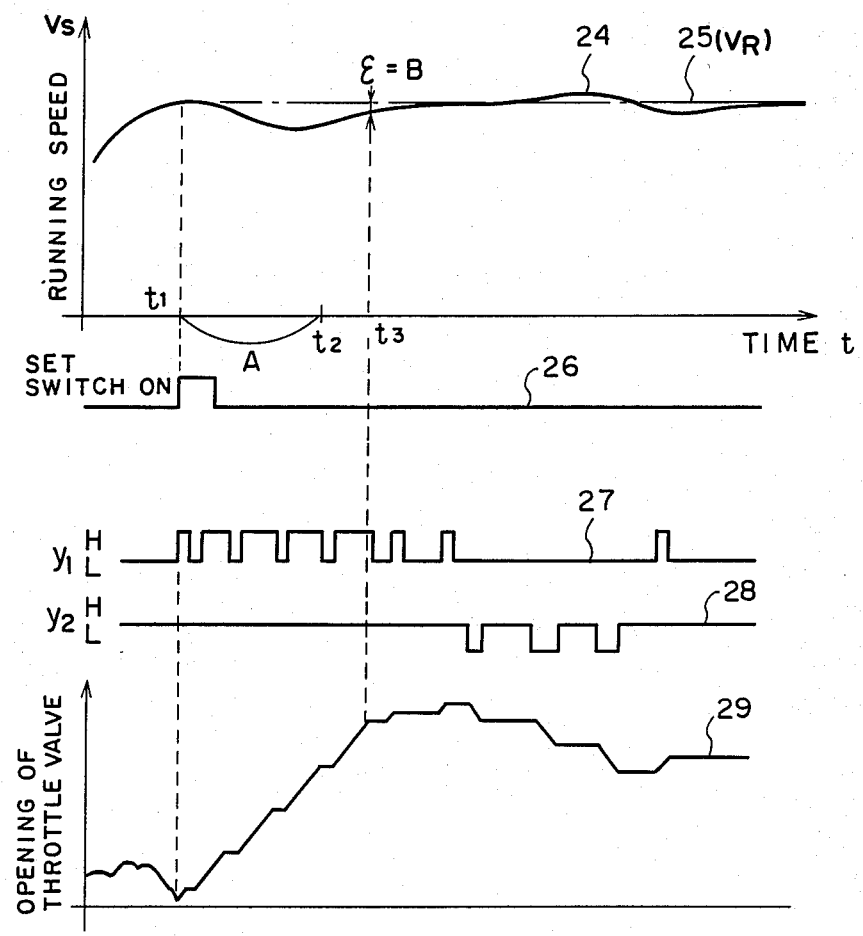
FIG. 6 is a time chart showing running speed, set switch input, control signals $y_1$ and $y_2$, and throttle valve operation in the same constant-speed running control device for vehicles.

Next described is one example of operation by referring to FIG. 6. Assuming that the running speed $v_s$ varies with time as indicated by 24, the SET switch signal 26 is inputted at the time $t_1$ to set the target speed $v_r$ 25.

Here, the time measuring means operates; if within the specific time A ($t_2$), the controlled variable is determined by a method of calculation with the control gain increased more than usual, by Step 119 of FIG. 4(a), and is outputted.

This indicates that, immediately after setting, the running speed is in the vicinity of the target speed and the delay of the running speed in relation to the opening of the throttle valve is taken into consideration.

Thereafter, when the speed deviation $\epsilon$ exceeds the specified value B, the speed deviation is regarded still to be large and accordingly control is continued in the state of an increased control gain.

The control described above can rapidly bring the opening of the throttle valve 9 to the vicinity of throttle opening corresponding to this state.

Subsequently, when the speed deviation $\epsilon = B$, the control gain is diminished to a common value, and the controlled variable is computed at Step 120 in FIG. 4(a). This is based on the judgement that the throttle valve opening has nearly reached a proper position at the time when the running speed $v_s$ approached the target speed $v_r$.

The control signals $y_1$ and $y_2$ based on the controlled variable will become 27 and 28 respectively, and accordingly the opening of the throttle valve varies as indicated by 29.

As explained above, since, during the specific period of time after setting, the control is performed with the control gain increased, the vehicle speed can rapidly reach the target speed without causing the speed deviation immediately after setting to increase depending on road conditions and the amount of play and without causing the running speed to exceed the target speed immediately after setting.

The throttle valve drive means 7 comprises the solenoid valves 21 and 22 and the diaphragm device 23, but a motor type such as the conventional control device shown in FIG. 1(b) may be used.

What is claimed is:

1. A constant-speed running control device for a vehicle, comprising: a running speed sensing means which senses the running speed of the vehicle; an acceleration computing means which determines acceleration of the vehicle at specific periods of time from a running speed signal sensed by said running speed sensing means; a target speed setting means which sets a target speed in order in maintain a fixed target speed of the vehicle; a target speed signal generating means which generates said target speed; a speed deviation computing means which determines speed deviation between said running speed signal and said target speed signal; a throttle valve driving means which control a throttle valve of the vehicle; a controlled variable computing means which inputs an acceleration signal and a speed deviation signal and computes a controlled variable for controlling the throttle valve of the vehicle such that said running speed will correspond to said target speed; a constant-speed running start sensing means for sensing the start of constant-speed running by said target speed setting means; a time measuring means which measures a specific time from the time when this constant-speed running is started; and a controlled variable adjusting means which adjusts said controlled variable in accordance with said speed deviation signal and a time measuring information given from said time measuring means, unconditionally outputting said adjusted controlled variable to said throttle valve driving means when a specific time is not over, and similarly outputting a controlled variable to said throttle valve driving means when said speed deviation exceeds a specific value when said specific time is over, and outputting a non-adjusted controlled variable to said throttle valve driving means when said speed deviation decreases under said specific value.

* * * * *

UNITED STATES PATENT AND TRADEMARK OFFICE
CERTIFICATE OF CORRECTION

| | |
|---|---|
| PATENT NO. : | 4,856,609 |
| DATED : | August 15, 1989 |
| INVENTOR(S) : | YASUO NAITO |

It is certified that error appears in the above-identified patent and that said Letters Patent is hereby corrected as shown below:

```
Col. 7, line 50, align "Y2" on top of column 4;
Col. 7, line 63, delete "so as".
Col. 8, line 60, "in" (second occurrence) should be --to--;
Col. 8, line 65, "control" should be --controls--.
```

Signed and Sealed this

Thirteenth Day of November, 1990

*Attest:*

HARRY F. MANBECK, JR.

*Attesting Officer*     *Commissioner of Patents and Trademarks*